United States Patent [19]
Ishihara et al.

[11] 3,859,619
[45] Jan. 7, 1975

[54] VALVE OPERATION DETECTING DEVICE

[75] Inventors: Shinya Ishihara, Anjo; Kiyohiko Mizuno, Nagoya; Hiroaki Nishimura, Kariya, all of Japan

[73] Assignee: Nippondenso Co., Ltd., Showa-cho, Kariya-chi, Aichi-ken, Japan

[22] Filed: June 20, 1973

[21] Appl. No.: 371,881

[30] Foreign Application Priority Data
July 11, 1972 Japan.............................. 47-82366
July 11, 1972 Japan.............................. 47-82367
July 11, 1972 Japan.............................. 47-82368

[52] U.S. Cl. ............... 340/238, 137/554, 200/83 L, 200/83 Q
[51] Int. Cl...................... G08b 21/00, F16k 37/00
[58] Field of Search................... 340/238, 282, 200; 200/DIG. 1, 83 L, 83 Q; 137/554

[56] References Cited
UNITED STATES PATENTS

| | | |
|---|---|---|
| 2,115,578 | 4/1938 | Hall.............................. 340/200 UX |
| 2,439,047 | 4/1948 | Grinstead et al. .............. 340/200 X |
| 3,095,902 | 7/1963 | Cayon............................ 340/238 X |
| 3,545,486 | 12/1970 | Larson................................. 137/554 |
| 3,551,620 | 12/1970 | Hoover ........................ 340/238 UX |
| 3,602,254 | 8/1971 | Fawkes................................ 137/554 |

Primary Examiner—John W. Caldwell
Assistant Examiner—Daniel Myer
Attorney, Agent, or Firm—Cushman, Darby & Cushman

[57] ABSTRACT

A valve operation detecting device having a sensing means, such as a reed switch, a differential transformer or a variable capacitor which operates in accordance with the movement of a valve body provided in the valve for detecting the opening and closing operation of the valve body to be able to recognize and confirm the valve body operation from the outside easily.

2 Claims, 3 Drawing Figures

PATENTED JAN 7 1975　　3,859,619

VALVE OPERATION DETECTING DEVICE

BACKGROUND OF THE INVENTION

This invention relates to a valve operation detecting device which is useful to recognize and confirm opening or closing conditions of the valve body of a diaphragm type valve from the outside. The above mentioned diaphragm type valve is designed for such specific use as a part of vehicle engine for purifying exhaust gas therefrom. In a conventional engine, various diaphragm type valves are installed to reduce harmful components in the exhaust gas, but it is difficult to recognize and confirm from the outside of the valve whether the valve is normally operating or not.

SUMMARY OF THE INVENTION

With a view to overcome the problem described above, it is a primary object of the present invention to provide a valve operation detecting device with simple construction, thereby being able to confirm and recognize opening and closing operation of the valve from the outside with great ease.

The above and other objects, features and advantages of the present invention will be apparent from the following detailed description of preferred embodiments thereof taken in conjunction with the accompanying drawings.

BRIEF DESCRIPTION OF THE PREFERRED EMBODIMENT

Figure 1:
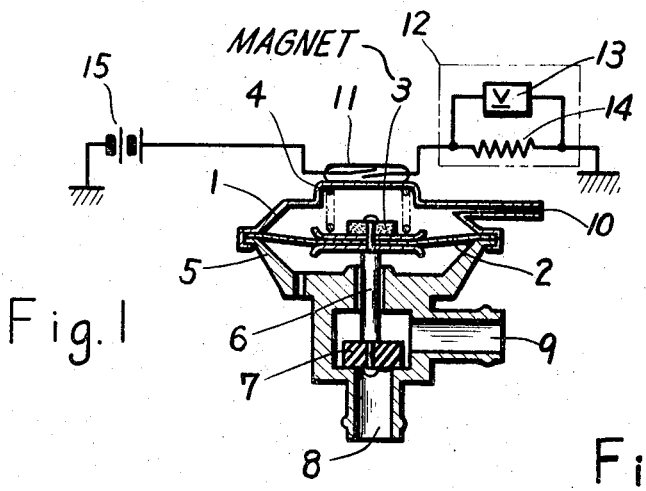
FIG. 1 shows a cross sectional view of the first embodiment of the present invention.

Referring to FIG. 1, numeral 1 designates a covering case made of non-magnetic material, 2 a diaphragm, 3 a permanent magnet fixed on the top portion of a valve stem 6. Numeral 4 designates a spring, 5 a housing. 7 designates a valve body fixed on the lower end portion of the valve stem 6. The valve body 7 opens and closes the passage formed by conduits 8 and 9. Numeral 10 designates a pressure leading pipe fixed to the covering case 1, 11 designates a reed switch fixed on the covering case 1 and provided to face the permanent magnet 3 through the covering case 1. 12 designates an indicator composed of a voltage meter 13 and a resistor 14. This indicator 12 can be substituted by a mere indicating lamp, and the reed switch 11 can be separately constructed from the covering case 11 so that the reed switch can be removed from the case when it is not needed. Numeral 15 designates a battery.

The operation of the above described embodiment is as follows. When the vacuum pressure signal is applied to the diaphragm 2, the diaphragm ascends, compressing the spring 4, and the valve stem 6 is drawn up together with the permanent magnet 3 and the valve body 7. Therefore, the conduits 8 and 9 are connected with each other, and at the same time, the reed switch 11 closes owing to the magnetic force of the permanent magnet 3 thereby to energize the indicator 12. Consequently, the operation of the valve body 7 can be detected and recognized by the indicator 12 from the outside with great ease. And of course, when the vacuum pressure signal is cut, the diaphragm 2 descends downwardly together with the permanent magnet 3, the valve stem 6 and valve body 7 by the expanding force of the spring 4 to close the passage. Therefore, the reed switch 11 opens at the same time and the closing condition of the valve body 7 can also be detected and recognized from the outside by the indicator 12.

Figure 2:
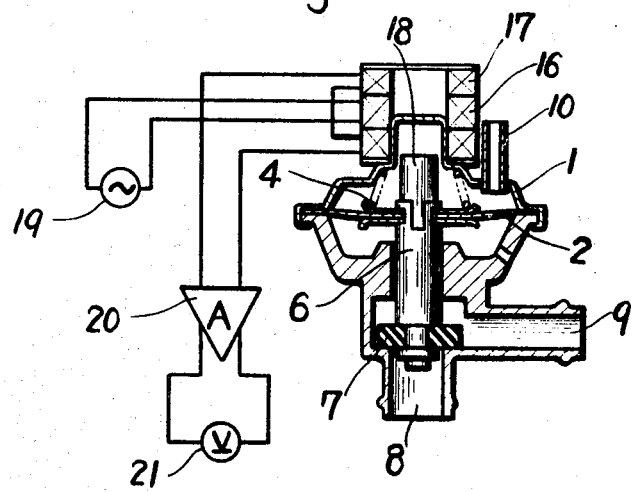
FIG. 2 shows a cross sectional view of the second embodiment of the present invention.

Referring to FIG. 2, numeral 16 and 17 designate coils provided on the covering case 1, 18 a moving core made of ferromagnetic material and fixed on the top end portion of the valve stem 6. The moving core 18 can be moved in the coils 16 and 17. Numeral 19 designates an oscillator to energize the coil 16. 20 designates a rectifying amplifier connected with the coil 17, 21 a voltage meter connected with the rectifying amplifier 20. Hereon, the covering case 1 is made of material having very small magnetic permeability.

The operation of the above described embodiment is as follows. As the moving core 18 moves in the coils 16 and 17 according to the pressure signal which is to be applied to the diaphragm 2, the induced electromotive force of the coil 17 varies in accordance with the position of the moving core 18. Therefore, the opening and closing operation of the valve body 7 can be detected and recognized by means of the voltage meter 21.

As apparently seen from above, according to these two embodiments, the reed switch 11 and the coils 16 and 17 are merely provided on the covering case 1, so that sealing problems which often arise when the leading wire is provided to pass through the case or housing can be eliminated.

Figure 3:
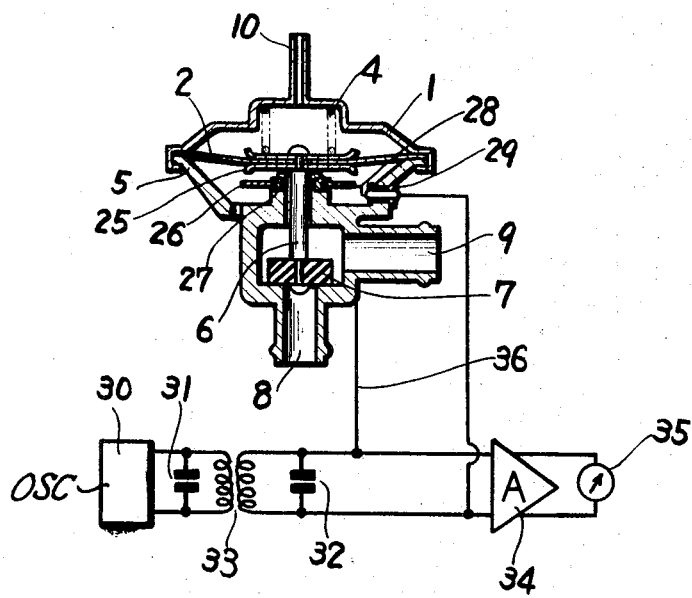
FIG. 3 shows a cross sectional view of the third embodimnet of the present invention.

Referring to FIG. 3, numeral 25 designates a metallic supporting plate fixed to the diaphragm 2 and electrically connected with the housing 5, 26 an electrode plate fixed to the housing 5 through an insulating bush 27 to be juxtaposed to the supporting plate 25. Numeral 28 designates a leading wire connected with the electrode plate 26, 29 an insulating bush interposed between the leading wire 28 and the housing 5. Numeral 30 designates a high-frequency oscillator, 31 and 32 condensors, 33 a transformer, 34 a rectifying amplifier, 35 an indicator. The leading wire 28 is connected with one end of an induction coil of the transformer 33, and the housing 5 is connected with the other end of the induction coil through a leading wire 36.

The operation of the above described embodiment is as follows. As the supporting plate 25 moves to vary the distance between the electrode plate 26 and itself according to the pressure signal which is to be affected to the diaphragm 2, the capacity between the plates 25 and 26 varies according to the pressure signal. Therefore, the operation of the valve body 7 can be detected and recognized by the indicator 35.

As seen from the above description, a movable member such as the permanent magnet 3 in the first embodiment, the moving core 18 in the second embodiment and the metallic supporting plate 25 in the third embodiment is completely enclosed within the diaphragm device, so that any sealing is not needed for the movable member.

As the device according to the present invention is constructed above, it can achieve the aforementioned primary object without changing the construction of the valve substantially, without interrupting the function of the valve and without increment of producing cost.

What we claim is:

1. A valve operation detecting device for detecting the opening and closing operation of a valve wherein said valve includes:
   a valve body,
   a movable diaphragm connected to said valve body, and
   a non-magnetic covering case enclosing said diaphragm,
   the detecting device comprising
      a reed switch removably mounted on said non-magnetic covering case,
      a permanent magnet movable with respect to said reed switch in accordance with the movement of said diaphragm, and
      indicating means connected to said reed switch for indicating the movement of said valve body in accordance with the opening and closing of said reed switch.

2. A valve operation detecting device for detecting the opening and closing operation of a valve body, a movable diaphragm connected to said valve body, and a non-magnetic covering case enclosing said diaphragm, the detecting device comprising:
   a differential transformer having coils removably mounted on said non-magnetic covering case,
   a permanent magnet core movable with respect to said coils in accordance with the movement of said diaphragm, and
   indicating means connected to said coils for indicating the movement of said permanent magnet core with respect to said coils.

* * * * *